(12) United States Patent
Allen

(10) Patent No.: US 10,517,240 B2
(45) Date of Patent: Dec. 31, 2019

(54) TREE WATER BAG AND DRIP EMITTER DEVICE

(71) Applicant: Wow Product Sales, LLC, Fenton, MI (US)

(72) Inventor: David M. Allen, Fenton, MI (US)

(73) Assignee: Wow Product Sales, LLC, Fenton, MI (US)

( * ) Notice: Subject to any disclaimer, the term of this patent is extended or adjusted under 35 U.S.C. 154(b) by 0 days.

(21) Appl. No.: 15/698,627

(22) Filed: Sep. 7, 2017

(65) Prior Publication Data

US 2018/0064043 A1     Mar. 8, 2018

Related U.S. Application Data

(60) Provisional application No. 62/384,266, filed on Sep. 7, 2016.

(51) Int. Cl.
*A01G 29/00*         (2006.01)
*A01G 27/00*         (2006.01)

(52) U.S. Cl.
CPC .............. *A01G 29/00* (2013.01); *A01G 27/00* (2013.01)

(58) Field of Classification Search
CPC ................ A01G 13/02; A01G 13/0237; A01G 13/0243; A01G 13/10
USPC ..................... 47/20.1, 21.1, 23.3, 25, 29, 30
See application file for complete search history.

(56) References Cited

U.S. PATENT DOCUMENTS

| | | | | |
|---|---|---|---|---|
| 1,244,576 A * | 10/1917 | Arnold | ............... | A01G 13/0281 47/21.1 |
| 3,896,586 A * | 7/1975 | Caldwell | ................ | A01G 13/04 47/21.1 |
| 4,087,938 A * | 5/1978 | Koch | ..................... | A01G 29/00 239/200 |
| 4,336,666 A * | 6/1982 | Caso | ..................... | A01G 27/006 47/21.1 |
| 4,642,938 A * | 2/1987 | Georges | ............. | A01G 13/0237 47/2 |
| 4,700,507 A * | 10/1987 | Allen | ................. | A01G 13/0243 47/32.4 |
| 5,117,582 A * | 6/1992 | Cissel, Jr. | .............. | A01G 23/04 47/21.1 |
| 5,212,905 A * | 5/1993 | Philoctete | .............. | A01G 25/00 47/21.1 |
| 6,385,900 B1 * | 5/2002 | George | .................. | A01G 29/00 47/40.5 |
| 6,705,044 B2 * | 3/2004 | Clancey | ............. | A01G 13/0281 47/31.1 |
| 7,013,597 B1 * | 3/2006 | Dominguez | ....... | A01G 13/0212 47/31.1 |

(Continued)

*Primary Examiner* — Monica L Williams
*Assistant Examiner* — Aaron M Rodziwicz
(74) *Attorney, Agent, or Firm* — The Watson IP Group, PLC; Jovan N. Jovanovic

(57) ABSTRACT

A tree water bag that has a bag body, a tying assembly and a dispensing assembly. The bag body has a first side edge and a second side edge. The tying assembly is configured to couple the first side edge to the second side edge to define a hoop with the bag body. The dispensing assembly has at least one drip tube coupled to the bag body and extending therefrom. A drip emitting device is also disclosed having a nozzle with a main body and an inverted discharge portion positioned at the distal end of the main body.

6 Claims, 3 Drawing Sheets

(56) References Cited

U.S. PATENT DOCUMENTS

| | | | | |
|---|---|---|---|---|
| 7,082,716 B2 * | 8/2006 | Downey | ............... | A01G 25/02 |
| | | | | 239/273 |
| 8,296,995 B1 * | 10/2012 | Georges | ............ | A01G 13/0243 |
| | | | | 47/20.1 |
| 8,683,741 B2 * | 4/2014 | Castagno | ............ | A01G 13/043 |
| | | | | 206/423 |
| 9,814,188 B2 * | 11/2017 | Almudhyan | ........... | A01G 27/02 |
| 2006/0283079 A1 * | 12/2006 | McGough | .............. | A01G 25/02 |
| | | | | 47/48.5 |
| 2012/0168536 A1 * | 7/2012 | Downey | ............... | A01G 25/02 |
| | | | | 239/547 |

\* cited by examiner

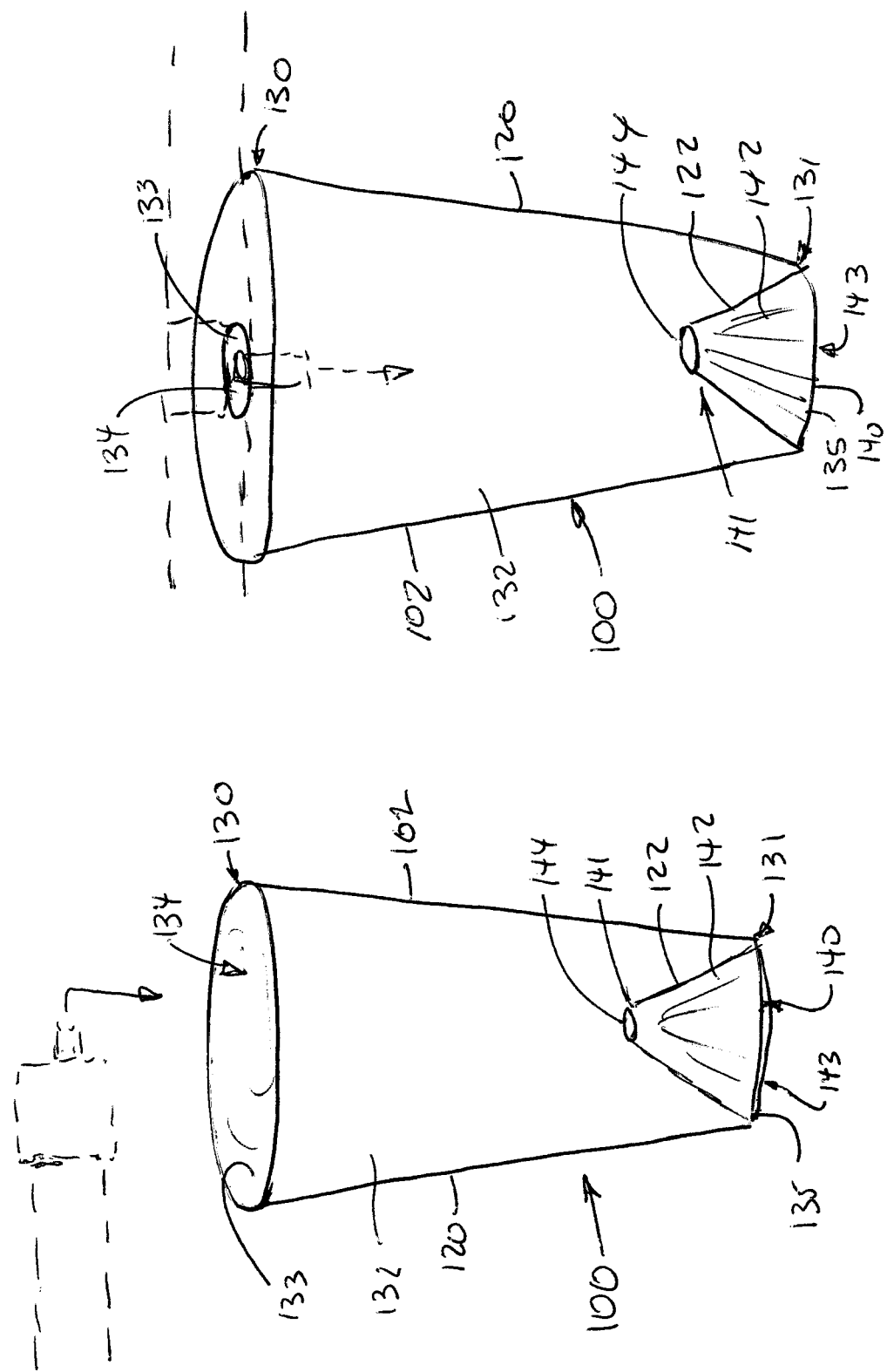

TREE WATER BAG AND DRIP EMITTER DEVICE

CROSS-REFERENCE TO RELATED APPLICATION

This application claims priority from U.S. Pat. App. Ser. No. 62/384,266, filed Sep. 7, 2016, entitled Tree Water Bag, the entire specification of which is hereby incorporated by reference in its entirety.

BACKGROUND OF THE DISCLOSURE

1. Field of the Disclosure

The disclosure relates in general to watering implements, and more particularly, to a tree water bag for providing water to trees and shrubs as well as a drip emitter device which is structurally configured to minimize clogging.

2. Background Art

The use of different watering techniques for trees, shrubs, flowers and the like are known in the art. There are problems associated with the current designs. Among other issues, the current devices often do not deliver water (or other nutrients) to the proper location. Often, water pools on the surface of compacted soil around the plant. In other instances, the water is soaked up by mulch or other overlying materials.

BRIEF DESCRIPTION OF THE DRAWINGS

The disclosure will now be described with reference to the drawings wherein:

FIG. 5 of the drawings is a perspective view of an embodiment of the drip emitting device (nozzle) of the present disclosure; and FIG. 6 of the drawings is a perspective view of another embodiment of the drip emitting device (nozzle) of the present disclosure.

DETAILED DESCRIPTION OF THE DISCLOSURE

Figure 4:
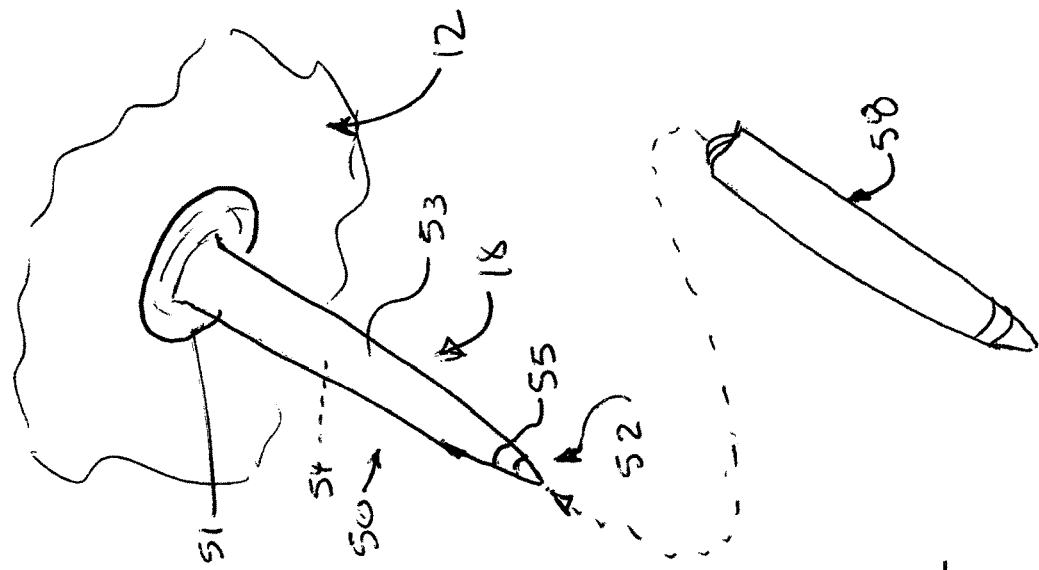
FIG. 4 of the drawings is a perspective view of a drip tube of the dispensing assembly of the tree water bag of the present disclosure.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1:
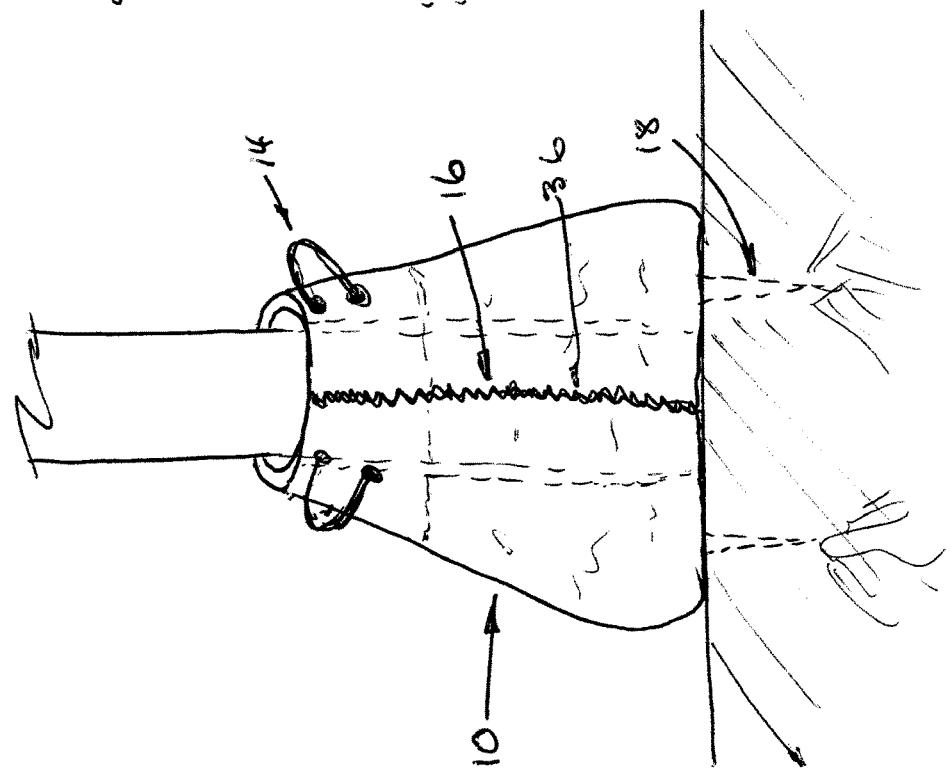
FIG. 1 of the drawings is a partial perspective view of a tree having the tree water bag of the present disclosure positioned in an operable position therearound, with the drip tubes inserted into the ground.

Referring now to the drawings and in particular to FIG. 1, the tree water bag is shown generally at 10. It will be understood that the tree water bag is positionable to encircle (at least partially) a tree at the base thereof. Water that is in the water bag is then directed from the bag into the soil, as will be explained. The particular dimensions of the tree water bag and its components may be varied without departing from the scope of the disclosure. It is also contemplated that for larger trees, multiple tree water bags may be coupled together to encircle the same.

Figure 3:
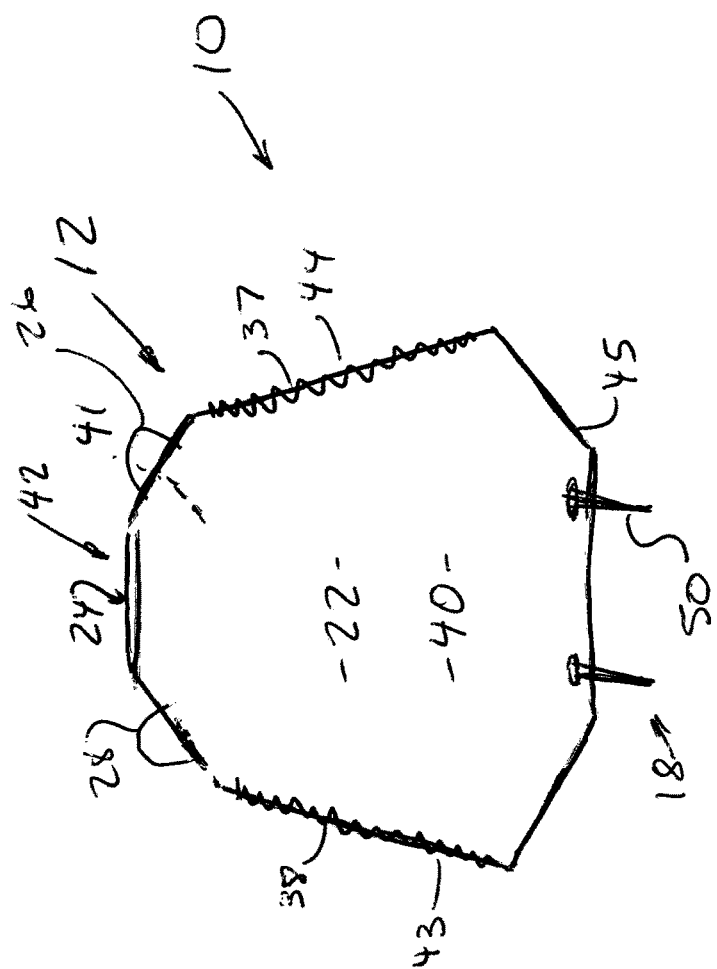
FIG. 3 of the drawings is a second side elevational view of the second side panel, showing, in particular, the handling assembly, the tying assembly and the dispensing assembly of the tree water bag of the present disclosure.
Figure 2:
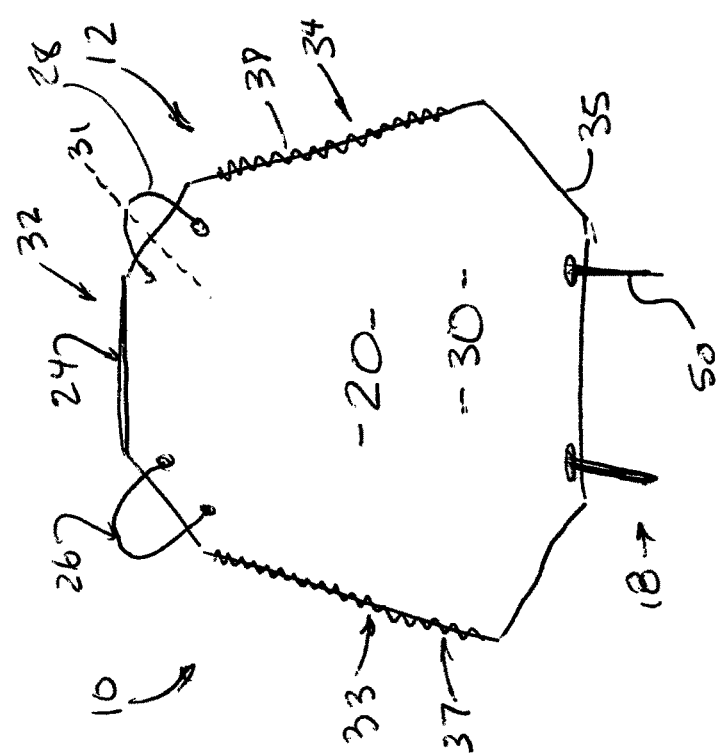
FIG. 2 of the drawings is a first side elevational view of the first side panel, showing, in particular, the handling assembly, the tying assembly and the dispensing assembly of the tree water bag of the present disclosure.

With reference to FIGS. 2 and 3, the tree water bag 10 includes bag body 12, handling assembly 14, tying assembly 16 and dispensing assembly 18. The bag body 12 comprises a pillow type bag of a generally trapezoidal (or octagonal) flat configuration. It will be understood that in other configurations, the pillow type bag may have curved features or rounded features. The particular shape is such that the bag can be wrapped about a tree. In still other configurations, instead of a pillow type bag, a bag having gussets and the like is contemplated for use.

The bag body 12 in the configuration shown includes first side panel 20 and second side panel 22, which cooperate to form top opening 24 which provides access to cavity 29. The first side panel overlies the second side panel when in the flattened configuration and the two are generally co-extant, although variations are contemplated, to, for example, give the bag body a curve by making one of the panels bigger than the others. The first side panel includes outer surface 30, inner surface 31, top end 32, first side edge 33, second side edge 34 and bottom edge 35. The second side panel 22 includes outer surface 40, inner surface 41, top end 42, first side edge 43, second side edge 44 and bottom edge 45. It will be understood that parts of the top end, the first side edges, the second side edges and the bottom edges of the first and second side panels can be coupled together (by, for example stitching, heat seals, RF seals, or the like), to form the bag body, with a portion of the top end being left uncoupled to form the top opening 24. It will be understood that in some configurations, the first side panel and the second side panel can comprise a single panel that is folded over itself. In such a configuration one of the edges comprises a fold. It will be understood that the bag body defines a substantially fluid tight cavity 29, and preferably a fully fluid tight cavity.

The handling assembly 14 is shown in FIGS. 2 and 3 as comprising a pair of handles, namely first handle 26 and a second handle 28. The two handles are positioned on opposing sides of the top opening 24 (along an angled seam that forms a part of the first and second side edges). The handles extend beyond the respective edges and comprise a loop of strapping. Such a material provides the user with the ability to grasp and manipulate the tree water bag in an empty configuration, or even in a full configuration wherein the bag is mounted in the operable position about a tree. Of course, other constructions are contemplated, including additional handles, or handles and grasping structures of different configurations. For example, in the place of a strap, a rigid molded handle may be sealed, adhered or otherwise joined to the outside surface of one or both of the first and second side panels.

The tying assembly is configured to join at least portions of the first side edge to at least portions of the second side edge. In the configuration shown, the tying assembly comprises a zipper 36 having a first part 37 and a second part 38. The first part 37 of the zipper 36 extends along the first side edge 33 of the first side panel and the second side edge 44 of the second side panel (which edges are joined together at the first part 37). Similarly, the second part 38 of the zipper 36 extends along the second side edge 34 of the first side panel and the first side edge 45 of the second side panel (which edges are joined together at the second part 38). As will be explained below, the joining of the first part 37 and the second part 38 forms the zipper 36, and forms the bag body into a loop or elongated hoop.

In other configurations, something other than a zipper is contemplated for joining the opposing side edges together. For example, the tying assembly 16 may comprise a plurality of straps on one side edge that have ring or buckle structures on the opposite side edge. In other configurations, hook and loop fasteners (on straps or otherwise) may be employed. In still other configurations, other fasteners, such as snaps, mating slots and tabs, threaded fasteners and the like may be employed.

The dispensing assembly 18 is shown as comprising a plurality of drip tubes, such as drip tube 50. Each of the drip tubes are substantially identical in configuration (although variations are contemplated). As such, the drip tube 50 will be described with the understanding that the remaining drip tubes are substantially of the same structure (again, with the understanding that the structures may vary).

With reference to FIG. 4, the drip tube 50 comprises a coupling end 51, distal end 52, outer surface 53, inner surface 54 and cuttable tip 55. The drip tube includes a base at the coupling end 51 that is attachable (through adhesion, welding or other manner) to the bag with an opening being placed thereat so that the inner surface 54 of the drip tube 50 is in fluid communication with the cavity 29 of the bag body 29. The drip tube 50 has a conical or cylindrical configuration, with a conical cuttable tip 55. It will be understood that depending where the tip is cut, the opening (due to the conical configuration of the cuttable tip) will vary in size. As such, the user can determine the flow rate desired. In the configuration shown, the drip tube may be between, for example, 3" and 12", although variations are contemplated wherein the drip tube may be longer or shorter than the exemplary ranges described. In some configurations, it is contemplated that extensions, such as extension 58 may be telescopically coupled to the drip tube 50, wherein the extension will include an opening so as to be able to dispense water from within the cavity 29 through the drip tube and through the extension into the soil.

In operation, the user first obtains a tree water bag. The user next places the tree water bag in operable position around a tree. Once around the tree, the user employs the tying assembly to attach the side edges of the bag body together. In the configuration shown, the first part 37 and the second part 38 of the zipper 36 are coupled together and zippingly attached together.

The bag is now positioned around the tree. The user can next grab a pair of snips, knife or other cutting implement and cut a portion of the cuttable tip so as to create an opening at the distal end 52 of each drip tube 50. The openings can all be made the same size or the size of the opening for each of the drip tubes can be different. It is contemplated that the drip tube may include markings that identify a particular size or flow rate associated with cutting the cuttable tip at such marking.

Once the openings are created, the user can determine the location of the drip tubes relative to the ground. The user can poke a pole, screwdriver or similar elongated implement into the ground to form a cavity in the ground that can receive the drip tube. This is repeated for each drip tube of the tree water bag. Once these are made, the drip tubes can be directed into a corresponding one of the cavities in the ground.

The tree water bag is now in condition for operation. The user can insert a hose or other water source into the top opening 24 of the bag body and fill the cavity 29 with the desired amount of water. As the bag is substantially, if not fully, fluid tight, the only means of dispensing the water (other than through evaporation through the top opening, where the top opening is not sealable through hook and loop fasteners or other fasteners) is through the openings in the drip tubes caused by cutting off the cuttable tip.

Advantageously, the water is directed through the drip tubes that are already inserted into the ground. As such, the water is delivered to the soil below the soil line. Water bypasses the upper compacted soil and mulch or the like. Additionally, where the tree is on an embankment or incline, runoff is minimized.

In another aspect of the disclosure, and with reference to FIGS. 5 and 6, the disclosure is directed to a drip emitting device 100 which may comprise a tube or hose that emits a dripping on the ground. Again, often, the water that is delivered is soaked up by mulch or other features on top of the soil, or puddles due to the compaction of the soil. In other instances, it may runoff. To combat the same, a nozzle structure can be inserted into the ground. Problematically, conventional nozzles may become clogged due to the soil and fail to operate. The nozzle of the present disclosure overcomes such drawbacks.

In the configuration shown, the nozzle 102 is shown as comprising main body 120 and inverted discharge portion 122. The main body 120 includes proximal end 130, distal end 132, outer surface 132, inner bore 133, upper opening 134 and lower opening edge 135. In the configuration shown, the main body may comprise a conical configuration, with the upper opening 134 being larger than the lower opening edge. In other configurations, the outer surface may be conical with the inner bore 133 being substantially uniformly cylindrical. Of course other variations are contemplated to both the outside surface and the inner bore. It is contemplated that the nozzle may be on the order of only a couple of inches long to about a foot in length, although both shorter and longer variations are contemplated.

The inverted discharge portion 122 comprises an upwardly conical or frusto-conical configuration (although pyramid like structures formed with walls in the place of a continuous circular cross-sectional slices are contemplated). The upwardly conical configuration of the inverted discharge portion includes lower end 140, upper end 141, outer surface 142, inner bore 143 and discharge opening 144. The inverted discharge portion 122 extends upwardly and inwardly and includes a discharge opening 144 at the upper end 141.

It will be understood that the inner bore 143 spans from the lower opening edge of the main body to the discharge opening of the inverted discharge portion, and, in turn, defines a conically shaped bore. A lower chamber is defined by the outer surface 142 of the inverted discharge portion and the inner bore 133 of the main body between the lower opening edge and the discharge opening.

Advantageously, when the nozzle is directed into the ground, as the discharge opening is inboard of the distal end 131 of the main body, the actual opening from which the water is discharged is spaced apart from the end of the nozzle. As such, the opening is substantially less likely to be clogged during insertion of the nozzle into the ground.

Depending on the drip system, it is contemplated that a drip nozzle can be inserted directly into the inner bore 133 of the main body 120 of the nozzle. In such a configuration, the proximal end 130 may be covered with a small upper opening 134. In other configurations, the nozzle may be positioned below a drip emitter and merely configured to catch the drips from the emitter through a relatively larger upper opening.

It will further be understood that such a nozzle design can be utilized at the distal end of the drip tubes 50 of the tree water bag. In some configurations, this may replace the cuttable tip and a cap may be provided to cover the nozzle prior to insertion of the nozzle into the opening made in the ground.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A tree water bag comprising:
   a bag body having a first side edge and a second side edge;
   a tying assembly configured to couple the first side edge to the second side edge to define a hoop with the bag body; and
   a dispensing assembly comprising at least one drip tube coupled to the bag body and extending therefrom, the at least one drip tube comprising a coupling end and a distal end, the coupling end attached to the bag body with an opening thereat so that an inner surface of the drop tube is in a fluid communication with a cavity of the bag body, the at least one drip tube further comprising a nozzle proximate to the distal end of the at least one drip tube, the nozzle comprised of an inverted discharge portion that extends inward into the at least one drip tube.

2. The tree water bag of claim 1 wherein the inverted discharge portion is conical or frusto-conical.

3. The tree water bag of claim 1 wherein the at least one drip tube is conical or cylindrical.

4. A drip emitting device comprising:
   a nozzle having a main body and an inverted discharge portion positioned at a distal end of the main body, the inverted discharge portion extending inward into a tube.

5. The drip emitting device of claim 4 wherein the inverted discharge portion is conical or frusto-conical.

6. The drip emitting device of claim 4 wherein the tube is conical or cylindrical.

* * * * *